Dec. 7, 1965     P. J. POLLARD     3,222,598
ELECTROENCEPHALOGRAPH WAVE ANALYZER
Filed March 16, 1961     3 Sheets-Sheet 1
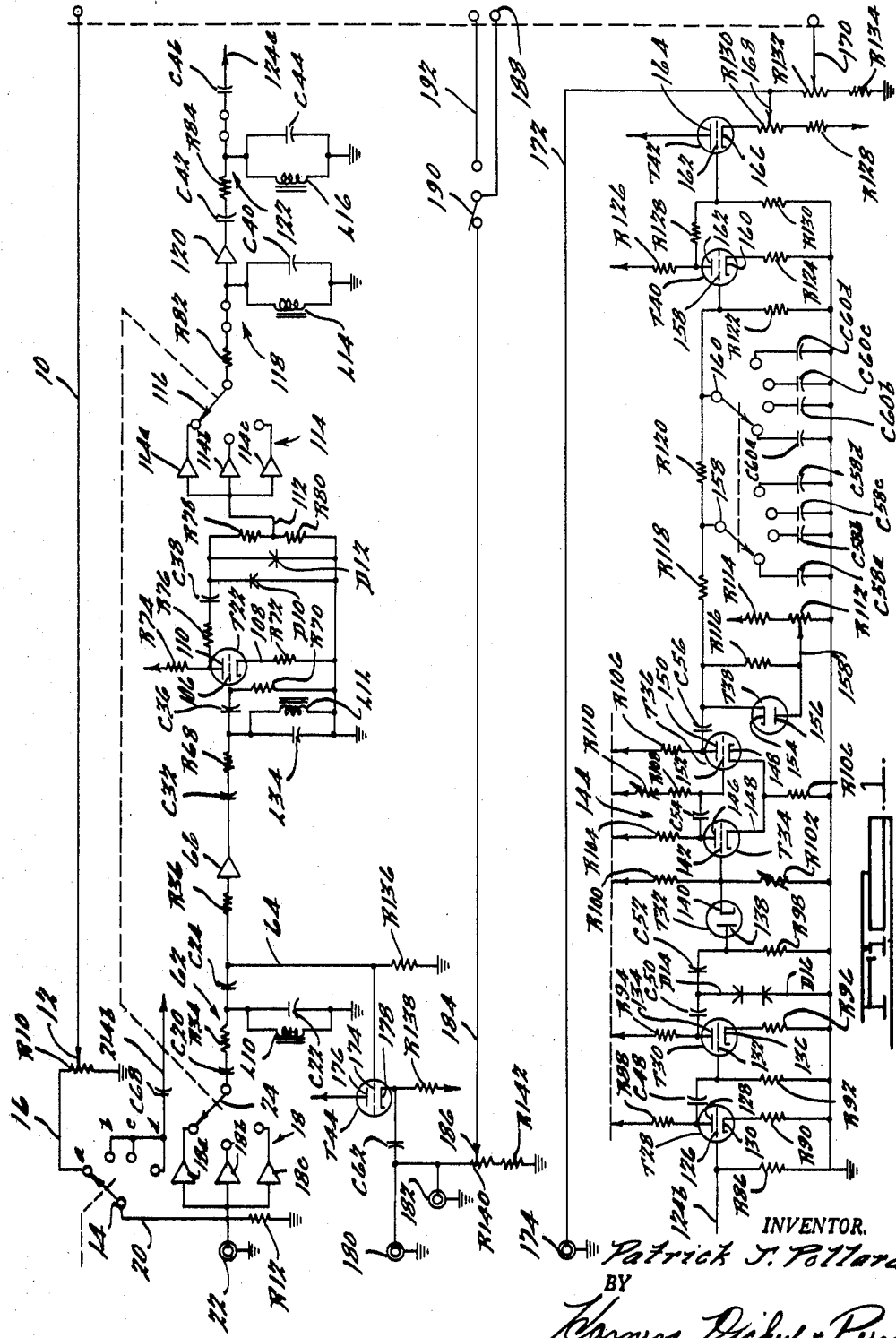
INVENTOR.
Patrick J. Pollard
BY
Karnes, Dickey & Pierce.
ATTORNEYS

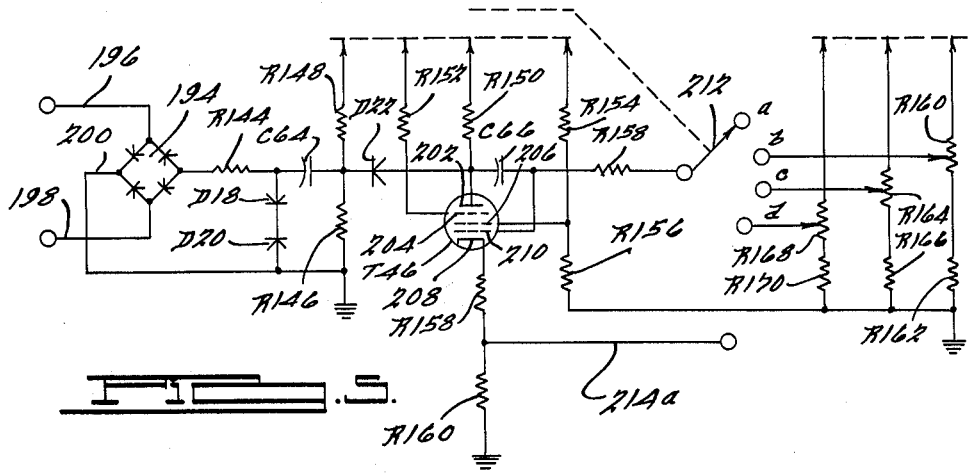
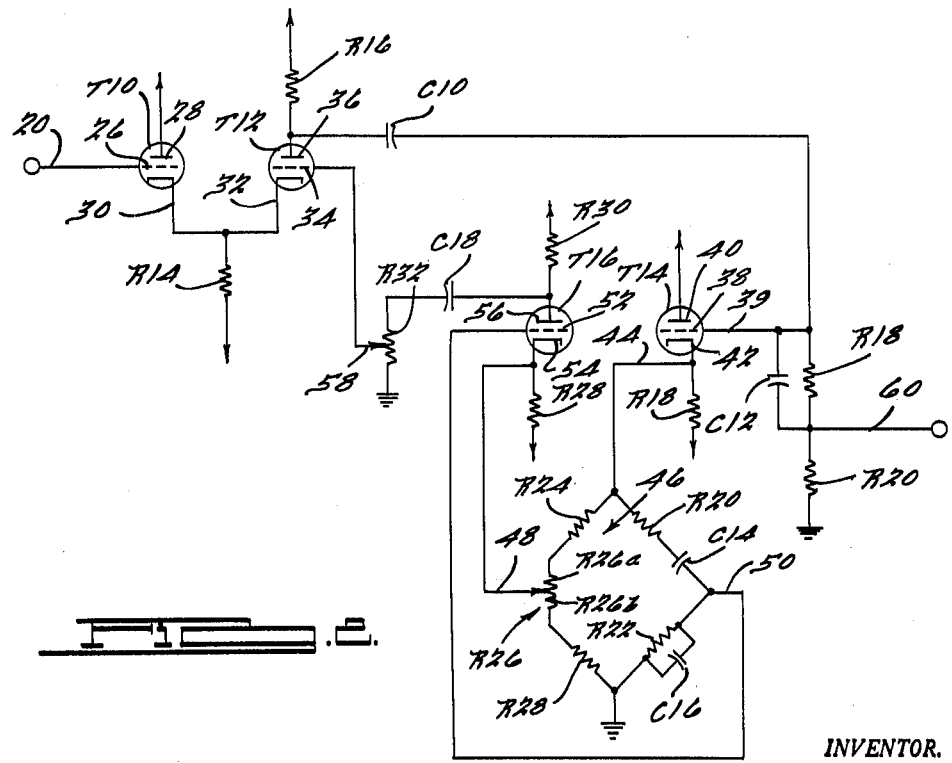

Dec. 7, 1965    P. J. POLLARD    3,222,598
ELECTROENCEPHALOGRAPH WAVE ANALYZER
Filed March 16, 1961    3 Sheets-Sheet 3
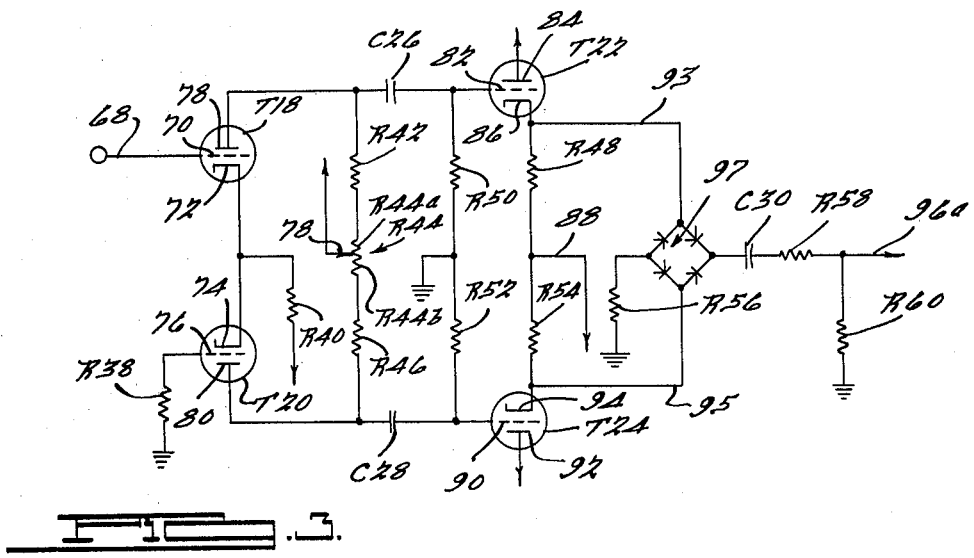
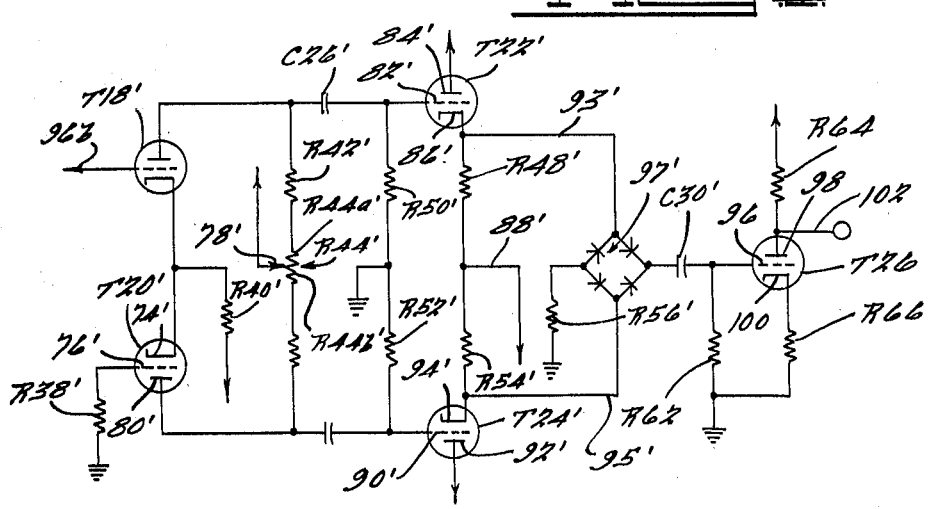
INVENTOR.
Patrick J. Pollard
BY
Harness, Dickey & Pierce
ATTORNEYS

United States Patent Office 3,222,598
Patented Dec. 7, 1965

3,222,598
ELECTROENCEPHALOGRAPH WAVE ANALYZER
Patrick J. Pollard, Clawson, Mich., assignor to Ralph L.
Sherman, Grosse Pointe Park, Mich.
Filed Mar. 16, 1961, Ser. No. 96,243
13 Claims. (Cl. 324—77)

This invention relates to apparatus for and method of analyzing electrical waves and more specifically to the apparatus for and method of analyzing the electrical output wave from an electroencephalograph.

While the above stated invention is described specifically for use in the analysis of the output wave from an electroencephalograph, it should be noted that the apparatus and methods disclosed herein are readily applicable for use in the analysis of electrical waves from sources other than an electroencephalograph.

The output signal from an electroencephalograph is a complex signal composed of many components. In many instances it is advantageous to be able to separate one or more of these components from the complex wave. One such component is called the alpha frequency which is known to fall within a range of frequencies from 8 to 12 cycles per second called the alpha band. It is also known that different individuals have different alpha frequencies within that range and that changes in the alpha frequency are related to changes in the condition of that individual's thyroid. While the alpha band ranges from 8 to 12 cycles per second, only slight deviations occur in the alpha frequency for any given individual. The changes in thyroid condition can be induced and can be made to occur instantaneously or over a long time period. In order that these changes can be studied some means are required for measuring the alpha frequency. The apparatus and methods as related in this invention are applied specifically to the determination of the alpha frequency and changes occurring therein through the analysis of a signal obtained from an electroencephalograph; however, as mentioned before, the principles of this invention are applicable in the analysis of complex electrical waves in general.

Various methods and theories have been used in the past by individuals to determine the alpha frequency from a signal from an electroencephalograph. In one method, a Fourier analysis is performed on an electroencephalogram in order to determine the frequencies of the constituent components of that wave. This is an extremely difficult and time-consuming procedure since numerous calculations are required. Other theories which provide more rapid solutions are, for the most part, hypothetical and thus, to that extent, inexact.

Some commercial wave analyzers for determining the alpha frequency use a series of sharply tuned networks having peaking frequencies, e.g., at 8, 9, 10, 11 and 12 cycles per second. In these analyzers the output from each of the filters is recorded and the one with the highest amplitude is taken as the alpha frequency. In cases where the alpha frequency lies midway between the peak frequencies the alpha frequency is then estimated. This leads to a certain inaccuracy since in this type of analysis it is literally impossible to determine whether there has been merely a change in the amplitude of the alpha frequency or whether there has been a numerical change in the alpha frequency. In this type of analyzer, if a greater accuracy is desired, a greater number of tuned networks is required. In the devices and methods mentioned above, the alpha frequency cannot be obtained directly but must be obtained through some calculation or extrapolation. In experimental tests made upon patients, dynamic studies are made by inducing changes in the thyroid and hence in the alpha frequency. It would be advantageous in these cases to be able to read the alpha frequency directly.

One difficulty in measuring the alpha frequency arises from the fact that the amplitude of the complex wave from an electroencephalograph can change drastically in magnitude due to a variation in the physical activity of the patient being tested. For example, the mere opening or closing of the patient's eyes can induce a change in the amplitude of the electroencephalograph wave in the ratio of 1000:1 while the change in amplitude of the alpha component is comparatively slight. With the occurrence of such a disturbance, or artifact, the alpha frequency is obscured such as to make its determination literally impossible by the method mentioned above during those periods of radical change.

Another difficulty is in the fact that the alpha frequency is of an extremely low magnitude, i.e., 8–12 c.p.s. This fact posed special problems in the detection, amplification, etc. of the alpha frequency.

The methods and apparatus of this invention eliminate the above-named disadvantages and provide a means for obtaining an accurate and instantaneously available recordation or presentation of the alpha frequency and its dynamic changes. The method and apparatus of this invention further provide an accurate indication of the alpha frequency even during periods of physical disturbances or artifacts. In addition to a measurement of the frequency of the alpha frequency, a measurement of the amplitude of the alpha frequency can be obtained. Therefore it is an object of this invention to provide a method and apparatus for analyzing a complex electrical wave whereby the instantaneous frequency of a preselected component of that complex wave can be determined.

It is another object of this invention to provide a method and apparatus for analyzing a complex wave whereby the frequency of a preselected component falling in a substantially low range of frequencies is accurately and instantaneously determined despite extreme variations in the magnitude of the complex wave.

It is a further object of this invention to provide a method and apparatus for analyzing a complex wave whereby the amplitude of a preselected component is accurately and instantaneously determined despite extreme variations in the magnitude of the complex wave.

It is another object of this invention to provide a method and apparatus for analyzing a complex wave whereby the frequency of a preselected component can be accurately and instantaneously determined despite variations in amplitude of the complex wave greater than 1000:1.

It is a further object of this invention to provide a method and apparatus for analyzing a complex wave whereby the amplitude of a preselected component can be accurately and instantaneously determined despite variations in amplitude of the complex wave greater than 1000:1.

It is another object of this invention to provide a method and apparatus for determining the magnitude of the alpha frequency from a complex wave from an electroencephalograph.

It is a further object of this invention to provide a method and apparatus for determining the amplitude of the alpha frequency from a complex wave from an electroencephalograph.

It is another object of this invention to provide a method and apparatus for accurately and instantaneously determining the magnitude of the alpha frequency from a complex wave from an electroencephalograph with the amplitude of the complex wave having extreme variations.

It is another object of this invention to provide a method and apparatus for determining the amplitude of the alpha frequency from a complex wave from an electroencephalograph with the amplitude of the complex wave having extreme variations.

It is another object of this invention to provide a method and apparatus for accurately and instantaneously determining the magnitude of the alpha frequency from a complex wave from an electroencephalograph with the amplitude of the complex wave varying by an amount greater than 1000:1.

It is an object of this invention to provide a method and apparatus for determining the frequency of a preselected component having a frequency of substantially low magnitude.

It is an object of this invention to provide a method and apparatus for determining the magnitude of the alpha frequency from a wave from an electroencephalograph.

Other objects, features and advantages of the present invention will become apparent from the subsequent description and the appended claims, taken in conjunction with the accompanying drawings, in which:

FIGURE 1 is a schematic diagram of an electrical circuit embodying some of the features of the present invention and in which some of the circuitry is representatively shown in block form;

FIGURE 2 is an electrical schematic diagram of a tuned network which is used in conjunction with the circuit of FIGURE 1;

FIGURES 3 and 4 are electrical schematic diagrams of a different stage of a multiplying circuit which is used in conjunction with the circuit of FIGURE 1;

FIGURE 5 is an electrical schematic diagram of a calibration circuit which is used in conjunction with the circuit of FIGURE 1.

In general, the determination of the alpha frequency from the complex wave from the electroencephalograph is accomplished by first passing the wave through a selected tuned network which, by means to be described, discriminates against frequencies other than that of the band of that particular network. Since the variations in alpha frequency of any particular individual are slight the total signal from the electroencephalograph can be passed through a network which is tuned to only a portion of the total alpha band. Since the range of frequencies dealt with is quite low, 8–12 c.p.s., it can be appreciated that tuned network construction, filter contruction, amplification and general circuit design become more critical and difficult. Thus, output from the tuned network is then passed through a frequency multiplying network which results in a numerical increase of the actual alpha frequency and any other frequency component yet remaining. The multiplied signal is passed through subsequent tuned networks and multiplying networks until a signal is obtained having a frequency which is some multiple of the alpha frequency which is suitable for amplification. The wave shape of the signal, which is a multiple of the alpha frequency, is amplified and then shaped by an appropriate network into a square wave having a relatively sharp rise time. The resultant square wave is then differentiated resulting in a plurality of positive and negative spikes. The positive spikes are used to trigger a one-shot multivibrator which produces an output having a constant amplitude and a constant duration. The output from the multivibrator, however, has a frequency dependent upon a frequency of the triggering pulse or the spiked output from the differentiation circuit. With signals from the multivibrator having a constant amplitude and being of a constant duration while varying in frequency, the average or D.C. level of the output from the multivibrator will be a function of the frequency of the output signal from the multivibrator. This, of course, is a function of the frequency of the input triggering pulse which is in turn a function of the magnitude of the alpha frequency. Thus direct voltage output is realized having an amplitude varying in accordance with the variations in the magnitude of the frequency of the alpha frequency. The D.C. or average value is utilized through appropriate means, recorder, etc., to provide an indication of the magnitude of the alpha frequency.

More specifically, looking now to FIGURE 1, the signal from an electroencephalograph (not shown) is fed into the analyzer by means of line 10 which is connected to a wiper 12 of a potential divider R10 which has one side connected to ground and the other side connected to switch 14 by means of conductor 16. The selector switch 14 has multiple positions 14a, b, c and d with the position 14a for direct connection to the incoming electroencephalograph signal and positions 14b, c and d for calibration of the instrument to be described later. The potential divider R10 is adjusted such that the incoming signal may traverse its maximum amplitude and still be within the operating range of the analyzer.

With the switch 14 in the position 14a, the incoming attenuated signal from the electroencephalograph is fed to a filter network 18 by means of conductor 20. The signal appearing at conductor 20 is provided with a path to ground via resistor R12. A jack 22 is also connected to conductor 20 and has one portion grounded and is used in conjunction with resistor R12 to provide a signal to be impressed across an oscilloscope or other type instrument (not shown).

The tuned network 18 is comprised of a plurality of tuned networks 18a, 18b and 18c. Each of the tuned networks 18a–18c is designed to pass a preselected band of frequencies and to provide a relatively high attenuation for frequencies outside of this band. In the embodiment as shown in FIGURE 1, the frequency range of the tuned network 18a is 8–10 cycles per second; of 18b is 9–11 cycles per second; and of 18c is 10–12 cycles per second. Note that the ranges are overlapping and thus provide an accurate coverage of the entire alpha band of 8–12 cycles per second. In operation, the appropriate tuned network 18a–18c is selected by means of switch 24 in accordance with the individual being tested. As previously mentioned, since the changes in alpha frequency of any individual are only slight, once a particular range has been established the test can proceed without any further alterations. Each of the tuned networks 18a–18c has a circuitry as shown in FIGURE 2 and comprises in general a cathode follower stage for minimizing the drift of the D.-C. level and an amplifying stage. The signal from the amplifier is fed into a frequency sensitive bridge which is tuned to provide a null for that portion of the alpha band corresponding to that particular tuned network. The resultant output which comprises components with frequencies outside of that portion of the alpha band is then fed back in reversed phase to the amplifier thus attenuating those frequencies outside of that portion of the alpha band. Those components with frequencies within that portion of the alpha band are amplified. Looking now to FIGURE 2, the signal from conductor 20 is fed to a grid 26 of a triode T10 connected as a cathode follower. A cathode follower type amplifier is used at this stage in order to prevent drift of the D.-C. level of the incoming signal. A plate 28 on tube T10 is connected to a B+ source while a cathode 30 is connected to a source of negative potential through a load resistor R14. The output from the cathode follower circuit of tube T10 is coupled to an amplifying tube T12 by means of a common connection between a cathode 32 of triode T12 and the cathode 30 of triode T10 and the resistor R14. Amplification by triode T12 of the signal across R14 is provided in accordance with the potential level of a grid 34 of that tube and the output is taken from a plate 36 which is connected to B+ by way of a plate load resistor R16. The output of tube T12 is coupled by means of a capacitor C10 to a voltage divider network comprising the resistors R18 and R20 with the latter being connected to ground. A capacitor C12 is connected across the resistor R18 and provides a low impedance path for the high frequencies. The output signal from the tube T12 appearing across resistors R18 and R20 and capacitor C12 is used in conjunction with a feedback circuit, to be described, in such a way as to attenuate components of the complex wave having frequencies outside of a preselected range. The potential across resistor R18, R20 and capacitor C12 is impressed between a grid 38 of a triode T14 and ground via a conductor 39. The tube T14 is connected as a cathode follower and has a plate 40 connected to a source of B+ and a cathode 42 connected to a source of negative D.-C. potential by means of a cathode load resistor R18. The output from the cathode follower circuit of triode T14 is taken from the resistor R18 by means of conductor 44 and is fed into a frequency sensitive bridge circuit 46.

The frequency sensitive bridge 46 operates in a conventional manner and is tuned to that preselected frequency range for that particular tuned network, e.g., for the tuned network 18a the corresponding frequency sensitive bridge 46 would be tuned to a frequency of 8–10 cycles per second. The frequency sensitive bridge 46 is comprised of a first leg having a resistor R20 connected in series with a capacitor C14.

Referring now to the tuned frequency bridge 46, one end of a first leg comprised of a resistor R20 in series with a capacitor C14 is connected to the conductor 44. The other end of the first leg is connected to a second leg comprising a resistor R22 shunted by a capacitor C16. The other end of the second leg is connected to ground. A third leg which is also connected to conductor 44 is comprised of a resistor R24 and a portion R26a of a voltage divider R26 depending up the position of a wiper 48 of the voltage divider R26. A fourth leg of the bridge comprises the other portion R26b of the voltage divider R26 serially connected to a resistor R28 which has its other end connected to ground. The potential between conductor 50 connected to the junction of the first and second legs and the wiper 48 between the third and fourth legs is at a null, the frequency range for which the bridge 46 is tuned. Depending on whether the bridge 46 is to be used as with networks 18a, 18b or 18c the frequency range to which it will be tuned will be 8–10, 9–11, or 10–12 cycles per second respectively. Thus components of the complex wave with frequencies in that range would be attenuated substantially more than those of other frequencies. Thus, in the type of frequency sensitive bridge as illustrated generally by 46, the components with frequencies in the frequency range to which the bridge is tuned are balanced out such that the potential resulting between conductor 50 and the wiper 48 is essentially composed of components of other frequencies. The conductor 50 is connected to a grid 52 of an amplifier tube T16, which has a cathode 54 connected to wiper 48 and to a source of negative direct voltage by means of a cathode biasing resistor R28. A plate 56 in triode T16 is connected to a source of B+ through a plate load resistor R30. Assuming now the proper position of switch 24 all save those with components of the complex wave frequencies in the alpha band are amplified in the tube T16.

The output signal from amplifier T16 is coupled by means of a capacitor C18 and a grid leak resistor R32 to the grid 34 of the amplifier tube T12. Resistor R32 is actually a variable voltage divider having a wiper 58 which allows the amplitude of the signal fed back to the tube T12 to be controlled by the position of a wiper 58 relative to that end of the resistor R32 which is connected to ground. The signal which is fed to the grid 32 of the tube T12 is reversed in phase relative to the signal applied to the resistor R14 and, hence, causes an attenuation of frequencies passing through tube T12 other than the frequencies in that part of the alpha band to which the frequency bridge 46 is tuned. Thus the complex wave from the electroencephalograph after passing through the appropriate one of the tuned networks 18a–18c has been substantially discriminated in favor of the alpha component. Note that by the use of feedback and a nulling circuit or balanced bridge as shown in FIGURE 2 wide fluctuations in amplitude of the electroencephalograph wave are automatically compensated for, since the amplitude of the feedback signal will be correspondingly greater.

The output from the tuned network is taken as the voltage drop across the resistor R20 and is fed to the subsequent circuitry by means of a conductor 60 and the movable member of switch 24. The selector switch 24 is moved to select the appropriate one of the tuned networks 18a–18c as determined by a method to be described later. The signal, through the switch 24, is coupled by means of a coupling and blocking capacitor C20 (FIGURE 1) to a tuned voltage divider 62 comprising a resistor R34 connected to one end of a tank circuit composed of an inductance coil L10 having a high Q connected in parallel with a capacitor C22. The tank circuit has its other end connected to ground and is tuned to provide maximum impedance for frequencies in the alpha band and a low impedance path for frequencies outside of the alpha band. The net result is an attenuation of frequencies other than alpha band frequencies. The output from the tuned voltage divider 62 is fed to another coupling and blocking capacitor C24 which is connected to the junction of resistor R34 and the tank circuit. The purpose of the capacitors C20 and C24 is to prevent D.-C. currents from passing through the inductance coil L10; D.-C. currents through the coil would cause saturation and a resultant loss of Q and tuning of the tank circuit. The signal through capacitor C24 is then fed to a multiplier circuit 66 by means of a dropping resistor R36 having one side connected to capacitor C24. The potential appearing between the other side of resistor R36 and ground is impressed across a multiplier 66 having a circuitry as shown in FIGURES 3 and 4.

Because of the difficulties in working with low frequencies it is desirable that the magnitude of these frequencies be increased such that more conventional circuitry may be employed. In general, the multiplier consists of a phase inverter for providing from the input signal a pair of signals 180° out of phase with each other. The pair of signals are then fed to a cathode follower push-pull stage where the two are combined in the usual fashion to provide a single output having twice the magnitude. This combined output is connected across a full-wave rectifier which produces the usual pulsating D.-C. output. This pulsating D.-C. output, however, when passed through a capacitor has alternating positive and negative portions which constitute a signal having a frequency twice that of the original signal. This signal is then fed into a circuit substantially identical to the previous one where a similar sequence of events causes a further frequency multiplication to occur. The ultimate result is a signal having a frequency of four times the original input signal.

Since there are other multiplication steps subsequently in the circuit and since all the circuits are basically similar, a description of the circuits in FIGURES 3 and 4 should suffice for all of the multiplication circuits. Also note that between FIGURES 3 and 4 the circuit construction for a good portion of both are identical. Components in FIGURE 4 which function similarly to those in FIGURE 3 are designated with a prime number. Thus, in regard to the circuits in FIGURES 3 and 4, like numbers indicate like components which function in a similar manner and thus discussion as to the components in FIGURE 3 will be deemed equally applicable to the similarly prime numbered components in FIGURE 4.

More specifically, and now looking to FIGURE 3, the resistor R36 (FIGURE 1) is connected to a conductor 68 in multiplier 66 which is in turn connected to a grid 70 of an amplifier tube T18. A cathode 72 of tube T18 is connected to a cathode 74 of another amplifier tube T20. A grid 76 of amplifier T20 is connected to ground by way of a grid leak resistor R38. Thus the input signal appearing between conductor 68 and ground is serially impressed across the grid 70 and cathode 72 of tube T18 and the cathode 74 and grid 76 of tube T20. A common cathode bias resistor R40 is connected to the cathodes 72 and 74 and thence to a source of negative potential. The output at a plate 78 of triode T18 is fed to the plate load which is comprised of a fixed resistor R42 and a portion R44a of a voltage divider R44, which portion depends upon the relative position of a wiper 78. The wiper 78 is thence connected to a source of B+ and provides the positive plate potential. The plate load for the plate 80 of triode T20 comprises fixed resistor R46 and the other portion R44b of the voltage divider R44. The B+ potential appearing at the wiper 78 is thus also applied to the plate 80 of the tube T20. The voltage divider R44 is adjusted such as to provide outputs that are equal from both tubes T18 and T20. The output from triode T18 is coupled by way of a coupling capacitor C26 and a grid resistor R50. The capacitor C26 is connected from the plate 78 of tube T18 to a grid 82 of tube T22 and also to grid resistor R50 which has its other side connected to ground. The triode T22 which is connected as a cathode follower amplifier has a plate 84 which is connected to B+ and a cathode 86 which is connected to a cathode load resistor R48 which is in turn connected to a source of negative voltage by means of conductor 88.

In a like manner the output potential appearing at the plate of tube T20 is coupled to a tube T24 by means of a coupling capacitor C28 and a grid dropping resistor R52 which has one end connected to a grid 90 of the triode T24 and the other end connected to ground. The tirode T24 which is connected as a cathode follower amplifier has a plate 92 connected to a source of B+ and a cathode 94 connected to conductor 88 and thence to a source of negative potential via a cathode load resistor R54. By means of conductors 93 and 95 the combined output across the cathode resistors R48 and R54 is impressed across a multiplying circuit 97 which, as depicted in FIGURE 3, is a full-wave rectifier bridge. One of the other ends of the bridge 97 is connected to ground via a resistor R56 while an opposite end is connected to ground by way of a coupling capacitor C30 and resistors R58 and R60. The resistors R58 and R60 act as a potential divider with the output potential appearing across resistor R60. Since the capacitor C30 prevents any direct current from passing through the voltage divider only the frequency multiplied alternating potential appears across the resistor R60. This potential is fed to a pair of tubes T18' and T20' (FIGURE 4) by way of a conductor 96a (FIGURE 3) which is connected to a conductor 96b in FIGURE 4. Since the circuit of FIGURE 4 is similar to that of FIGURE 3, a second frequency multiplication is obtained. The final output signal which now has a frequency of four times the original input signal at conductor 68 (FIGURE 3) now appears across resistor R62. The resistor R62 is a grid biasing resistor and is connected to a grid 96 of an amplifier T26 which has a plate 98 connected to a source of B+ by means of a plate load resistor R64. A cathode 100 in triode T26 is connected to ground via self-biasing resistor R66. The amplified output from the multiplying circuit which has a frequency of four times the input signal to the multiplier circuit is then fed by a conductor 102 to a coupling and blocking capacitor C32 to a second frequency sensitive voltage dividing network 104.

The frequency sensitive voltage divider 104 operates in a manner similar to that of the frequency sensitive voltage divider 62 and comprises a resistor R68 connected to one end of a tank circuit comprising a capacitor C34 and a high Q coil L12 parallelly connected thereacross. The tank circuit of the tuned voltage divider 104 has its other end connected to ground and is tuned for a frequency range of 32–48 cycles per second thus avoiding a high impedance to components with frequencies in that range. For components with frequencies outside of the 32–48 cycle per second band, the tank circuit of the tuned voltage divider 104 affords a lower resistance path and in combination with the resistor R68, provides attenuation of all frequencies outside of that band. Note that due to the frequency multiplication provided by the multiplier 66 the tank circuit of tuned voltage divider 104 is tuned to a frequency band four times that of the frequency band to which the tank circuit of the voltage divider circuit 62 was tuned. With the frequency of the desired component thus increased, the signal is now in a more suitable condition for amplitude amplification.

The potential across the tank circuit of the tuned voltage divider 104 is applied to a grid 106 of a voltage amplifying tube T22 by means of a coupling and isolating capacitor C36 and a grid leak resistor R70, which has one end connected to ground. Note that the capacitors C32 and C36 function to isolate the coil L12 from any direct current, thus preventing the coil from being saturated and preserving the high Q of that coil and the tuning of the tank circuit.

The triode amplifier T22 has a cathode 108 connected to ground via a cathode biasing resistor R72 and has a plate 110 connected to a source of B+ via a plate resistor R74. The potential variations at the plate 110 of triode T22 are coupled by means of a current limiting resistor R76 and a coupling capacitor C38 to a voltage regulating network comprising oppositely and parallelly connected diodes D10 and D12. The diodes D10 and D12 are actually zener diodes connected in parallel with reversed polarities in order that their steep forward characteristics may be utilized. The peaked output voltage occurring across the diodes will depend upon the value of the current limiting resistor R76. Thus even with extreme variations in magnitude of the complex wave from the electroencephalograph the voltage regulator as described will maintain a substantially constant output potential level. The regulated voltage appearing across the diodes D10 and D12 also appears across the load resistors R78 and R80, which are connected as a voltage divider such that the output potential is reduced by a preselected ratio to a lower potential at a conductor 112 connected between the two resistors.

The signal appearing at conductor 112 is a signal whose components have a sequence four times their original frequency and is a signal in which the components other than those originally within the alpha band have been substantially attenuated. However, further attenuating of the undesired frequencies must still be performed. Thus, the signal appearing at conductor 112 is then fed into a plurality of tuned networks generally designated by 114 and comprising networks 114a, 114b and 114c. These networks are similar in construction and operation to the networks 18a, 18b and 18c of the plurality of tuned networks generally designated by 18 and as shown in FIGURE 2. The critical difference however is that the tuned frequency bridge 46 as shown in FIGURE 2 is tuned to a frequency band of 32–40 cycles per second for the tuned network 114a, to a frequency band of 36–44 cycles per second for tuned network 114b, and to 40–48 cycles per second for tuned network 114c. The switch 116 is ganged to switch 24 as shown by the connecting dotted line such that when the switch 24 selects one of the tuned networks 18a–18c, switch 116 will select the related tuned network from the tuned networks 114a–114c having a frequency band of four times that of the selected tuned network from the plurality of tuned networks 18. Thus, if tuned network 18a having a band of 8–10 cycles per second were to be selected then the switch 116 would simultaneously select the tuned network 114a having a frequency band of four times that of tuned network 18a, or of 32–40 cycles per second.

The signal appearing at switch 116 is then fed into a tuned voltage divider network 118 which is similar in operation to the tuned voltage divider networks 62 and 104 and comprises a resistor R82 connected to a tank circuit which has a capacitor C40 connected in parallel to a high-Q coil L14. The other end of the tank circuit is grounded. As a result of the prior frequency multiplication in multiplier 66, the tank circuit of network 118 is tuned to a frequency range of 32–48 cycles per second and freely passes frequencies out of that range and in conjunction with resistor R82 relatively attenuates all frequencies other than frequencies within that band. The signal appearing across the tank circuit of the tuned voltage divider network 118 is fed into a second multiplier circuit 120.

The multiplier circuit 120 is of a construction similar to that of the multiplier circuit 66 as generally depicted in FIGURES 3 and 4, except for variations in parameters of the components. The frequencies of the composite signal fed into the multiplier 120 are all multiplied by four, thus raising the alpha band components to a frequency within a range of 128–192 cycles per second. The multiplied output from the multiplier 120 is then coupled to another tuned voltage divider network 122 by means of a coupling and isolating capacitor C42. The tuned voltage divider network 122 is similar to the other tuned voltage divider networks 62, 104, and 118 and comprises a resistor R84 connected to a tank circuit comprising a capacitor C44 connected in parallel to a high-Q coil L16. The other end of the tank circuit is connected to ground. The tank circuit comprised of the conductance L16 and a capacitor C44 is tuned to a band of frequencies of 128–192 cycles per second and, in conjunction with resistor R84, attenuates the frequencies outside of that band. That potential appearing across the tank circuit is then coupled to the next stage by means of coupling and isolating capacitor C46. Capacitors C42 and C46 isolate the inductance coil L16 from direct current and thereby prevent saturation, loss of Q, and ultimate loss of tuning.

In the circuitry up to now, the frequency range of the alpha band has been multiplied from a range of 8–12 cycles per second to a range of from 128–192 cycles per second. It can be appreciated that this is a range of frequency more readily amplified and worked with. Also, in the prior circuitry some voltage regulation was obtained and also, by means of the various tuned voltage dividers, substantial attenuation was accomplished of all frequencies other than those within the desired band or within a preselected multiple of that band. Combined amplification of frequencies within the desired band and attenuation of frequencies outside of that band was accomplished by the tuned networks 18 and 114. The signal then appearing at conductor 124a is one in which the frequency of the desired band has been changed by a factor of 16 and in which the other components of the complex electroencephalograph wave have been severely attenuated. In the subsequent circuitry the resultant wave appearing at conductor 124a is amplified. The amplified signal is then sent into a voltage regulating or clipping stage which results in an output having a clipped wave shape somewhat similar to a square wave. This clipped wave is then differentiated in order to obtain positive and negative spikes of relatively large magnitude. Positive portions of these spikes are then used to trigger a one-shot multivibrator circuit which provides for each triggered pulse a square wave, with each of the square waves having equal magnitudes and being of equal duration. The frequency, however, of these square waves is determined by the frequency of the positive spikes which is in turn a function of the alpha frequency. The resultant square wave from the multivibrator circuit is then clamped at the negative side of the square wave such as to provide only a plurality of positive pulses having a squared configuration. The average D.C. amplitude of the particular plurality of square waves is then an indication of the frequency of the alpha component. It can be appreciated that the clamping on the negative side of the square wave to change the zero level of the wave was necessary since otherwise the average value would be zero.

More specifically now, in FIGURE 1 a conductor 124a connected to capacitor C46 is connected to conductor 124b and the signal thus fed to a grid 126 of a vacuum tube T28 via a grid resistor R86, which has one end connected to ground. Amplification of the incoming signal occurs in triode T28 which has its plate 128 connected to B+ via plate resistor R88 and its cathode connected to ground via the self-biasing cathode resistor R90. The amplified signal appearing at the plate 128 of triode T28 is coupled to another amplifying tube T30 by means of a coupling capacitor C48 and a grid resistor R92. The grid resistor R92 has one end connected to ground and its other end connected to capacitor C48 and to a grid 132 of triode T30. Amplification of the incoming signal also occurs in tube T30 which has a plate 134 connected to a source of B+ via a plate resistor R94 and a cathode 136 connected to ground via a cathode biasing resistor R96. The twice amplified alternating current signal appearing at the plate 134 of tube T30 is then coupled to a voltage regulator by means of a coupling capacitor C50. The voltage regulator is comprised of a pair of zener diodes D14 and D16, which are serially connected with opposite polarities from the capacitor C50 to ground. The output from the voltage regulator comprising the diodes D14 and D16 is a clipped wave having a shape similar to that of a square wave. This output is differentiated by means of a differentiating circuit comprising a capacitor C52 and a resistor R98. The capacitor C52 is connected to the regulator or clipping circuit and thence to ground via the resistor R98. The output from the differentiating circuit is taken across resistor R98 and is a plurality of alternately positive and negative spikes of relatively large amplitude. It is common for small positive spikes to spuriously occur along with the negative spikes. Since only the principal positive spikes are desired to be used to trigger the multivibrator in a manner to be described, means were provided to insure that the multivibrator would not be triggered by the small positive spikes. In addition to being certain that low positive pulses do not trigger the multivibrator circuit, it is also desirable that the principal trigger pulse or spike have only a short pulse width or be of a short duration. In order that both of the above operational characteristics be accomplished, a gas tube diode T32 is connected to the differentiating circuit with its plate 138 between the capacitor C52 and resistor R98 and its cathode 140 to a voltage divider comprising a resistor R100 connected to a source of B+ and a variable resistor R102 connected to ground. The resistor R100 combined with the variable resistor R102 provide means for selecting the desired D.C. level relative to ground upon the cathode 140; in the circuit of FIGURE 1 the desired D.C. level is set such as to render the diode T32 conductive only at a predetermined value above zero thus insuring that none of the spurious positive spikes of low magnitude cause conduction and further providing that the tube T32 will be conductive for a portion only of the principal positive spike thus causing a narrower pulse width. During the negative pulses the diode T32, of course, will not be conductive. The resultant output across the variable resistor R102 is applied to a grid 142 of a tube T34 in the multivibrator circuit 144.

The multivibrator 144, which is of the one-shot type, comprises the tube T34 having a grid 142 connected as previously described and in addition having a plate 146 connected to a source of B+ through a plate resistor R104 and a cathode 148 connected to ground via a self-biasing resistor R106. The resistor R106 is also connected to a cathode 148 of a second tube T36 which has a plate 150 connected to a source of B+ via a plate resistor R106. Tube T36 has a grid 152 connected to a source of B+ via a fixed resistor R108 and variable resistor R110. The resistor R110 provides means for adjusting the potential level of the grid 152. Grid 152 is coupled to the plate 146 of tube T34 by means of a coupling capacitor C54.

In operation, the tube T34 is normally biased off while the tube T36 is biased to be normally conductive. Upon the occurrence of a positive spike of sufficient magnitude at the grid 142 of tube T34, tube T34 conducts, charging the capacitor C54. The capacitor C54 then discharges through the resistor R108 and variable resistor R110 in the grid circuit of tube T36 and provides a potential to cut that tube off. The discharge of capacitor C54 will continue for a length of time determined by the preselected RC time constant of the circuit. The discharge of the condenser C54 continues and tube T36 remains cut off until the grid potential of tube T36 reaches that point when the tube T36 can once more conduct. Upon the conduction of tube T36 an additional bias is provided through the common cathode resistor R106 which is sufficient to cut off the tube T34. Tube T34 is cut off until the next spike occurs. The ultimate result of this sequence is an output from tube T36 of essentially a square wave. Since the output from the plate 150 of tube T36 is coupled by means of a capacitor C56 to the remainder of the circuit, only the alternating current components will be passed. Thus the resultant output is a square wave having plus and minus oscillations about a zero potential axis. However, as previously discussed the magnitude of the alpha frequency was to be expressed in terms of the amplitude of a direct current potential. The direct current average of the square wave output, however, is zero since there are equal plus and minus oscillations. In order to provide a wave having an average direct current value, a clamping circuit is used such that the alternating square wave is converted to a plurality of unipolar pulses. In the clamping circuit a gas diode T38 has a cathode 154 connected to the coupling capacitor C56 and a plate 156 connected to a wiper 158 of a potentiometer R112 which has one end connected to ground. The other end of the potentiometer R112 is connected to a source of negative direct potential via a fixed resistor R114. The combination of fixed resistor R114 and the potentiometer R112 provides a voltage divider with the wiper 158' being adjustable to provide the desired level of D.C. potential on the plate 156. A load resistor R116 is connected across the plate 156 and the cathode 154 of the diode T38. In the operation of the circuit, the capacitor C56 is alternately charged and discharges through the resistance of resistor R116 and through the resistance of the diode T38. The desired reference potential is set by the position of the wiper 158'. With the appropriate settings, the output from the clamping circuit is a pulsating direct voltage having an average value at some point above the set reference potential.

Next the D.C. average of the pulsating square waves is obtained. In the circuit shown in FIGURE 1, a time constant circuit is shown which provides a filtering effect for obtaining the average or D.C. level of the pulsating signal. Variable means are included in the circuit for the selection of various time constants so that the output can range from a presentation showing the instantaneous magnitude of the alpha frequency to a showing of magnitudes over different periods of time. More specifically, the filter circuit is comprised of resistors R118 and R120 and with one of a plurality of capacitors C58a–C58d connected therebetween and thence to ground via a multi-position switch 158. In addition, a plurality of capacitors C60a–C60d are connected to the other side of resistor R120 and thence to ground via a multiposition switch 160. The switches 158 and 160 are ganged together and each simultaneously select a predetermined one of the associated capacitors to provide that range of time constants mentioned above in movement through each of the plurality of positions. The capacitors C58a–C58d and C60a–C60d are arranged in increasing magnitude, respectively. Thus, in the position as shown in FIGURE 1, the RC time constant of the circuit is the shortest and is designed to provide an instantaneous and continuous indication of variations in the alpha frequency. Subsequent positions of switches 158 and 160, respectively, provide increased time constants and average the plurality of positive pulses over a greater period of time. The resultant output which is continuously subject to change in accordance with changes in magnitude of the alpha frequency is then amplified by means of tube T40 with the filtered signal being connected across a grid resistor R122 which has one end connected to a grid 158 of tube T40 and its other end connected to ground. Triode T40 has its cathode 160 connected to ground via a self-biasing resistor R124 and a plate 162 connected to a source of B+ via plate resistor R126. The output at the plate 162 of triode T40 is then coupled to a grid 162 to a tube T42 via a voltage divider network comprising resistors R128 and R130. The grid 162 is connected midway between resistors R128 and R130 and thence to ground via the resistor R130. The triode T42 has a plate 164 connected to a suitable source of B+ and its cathode 166 connected to a source of negative D.C. through a serially connected fixed resistor R128 and a potentiometer R130. The tube T42 is operated as a cathode follower with the output taken off a wiper 168 connected with the potentiometer R130.

The output potential at wiper 168 is fed to a variable voltage divider comprising a potentiometer R132 connected to one end of the fixed resistor R134, which is connected to ground at its other end. The wiper 170 of the potentiometer R132 is connected to a suitable source for utilizing the D.C. output for reproducing in graphic form the variations in amplitude of the potential appearing at wiper 170.

When using the output potential at the wiper 170 for producing a trace with a pen recorder, the wiper 168 provides a means to set the pen zero on the recorder while the wiper 170 provides a means for calibrating the recorder. The calibration of the instrument will be described later.

The wiper 168 is connected by means of a conductor 172 to a jack 174 which can be connected to a suitable analogue type device where a visual reading can be made and observed of the instantaneous readings of the alpha frequency occurring at that time. Thus, a means has been provided whereby an instantaneous reading can be obtained of the alpha frequency and recorded and also a means have been provided whereby a visual reading can be obtained through a suitable calibrated meter so that the value of the alpha frequency can be readably and visually obtained at any one time.

In the initial discussion it was mentioned that the switches 24 and 116 were placed in the appropriate position in accordance with an initial determination of the magnitude of the alpha frequency. The initial determination is made through means of a digital counter which provides an average reading. While this does not, in effect, provide for an accurate instantaneous indication of the alpha frequency, it does provide a means whereby the average alpha frequency over a period of time can be obtained and thus an approximation of the instantaneous alpha frequency. With this information the switches 24 and 116 can then be placed in the appropriate position. In order to do this, the switch 24 is set first in the mid-range or 9–11 cycles per second position. As previously mentioned, the conductor 64 was connected midway between the capacitor C24 and the resistor R36. The potential at this conductor is applied to a grid 174 of a tube T44 by means of a grid resistor R136 which has one end connected to ground. Triode T44 has a plate 176 connected to a suitable source of B+ and a cathode 178 connected to a suitable source of negative D.C. voltage via resistor R138. The tube T44 is connected as a cathode follower and the output is taken from the cathode 178 and coupled by means of a capacitor C62 to output jacks 180 and 182. Two output jacks are provided such that an oscilloscope and a counter can be used concurrently, with the counter giving an indication of the alpha frequency. It should be noted that the average amplitude of the alpha frequency could be observed on the oscilloscope if it were properly calibrated.

As previously mentioned, it is sometimes desirable to record the amplitude of the alpha component. In order to provide means for recording this information, a voltage divider comprising a potentiometer R140 and a fixed resistor R142 are connected from capacitor C62 to ground. A wiper 186 associated with potentiometer R140 is connected to an appropriate recorder (not shown) via a conductor 184, a switch 190 (in the position as shown in FIGURE 1) and a conductor 188. The recorder can be calibrated by adjusting the position of the wiper 186. A conductor 192 has one end connected to the output of the electroencephalograph and the other end connected to switch 190. With switch 190 in the alternate position, the recorder connected to conductor 188 will record the unmodified complex wave from the electroencephalograph.

In setting up the analyzer, the ganged switches 24 and 116 are placed in a mid position or in the 9–11 cycle per second position, and in this position an initial reading is obtained upon a counter indicating the average value of the alpha frequency. With the switch 24 in the mid position, the attenuation of the other components of the alpha band, i.e., 8–12 cycles per second, is not such that an indication of frequencies within this band would not be obtained. Thus a preliminary reading of any alpha frequency is provided regardless of the fact that the switch 24 selects the 9–11 cycles per second tuned network. Once the average alpha frequency is known, the ganged switches 24 and 116 are then placed in the exact position and the apparatus is ready for operation.

As previously mentioned, means are provided in order that the device can be calibrated. This is done by providing a signal of a known frequency and setting the output adjustment controls (wiper 170 of potentiometer R132) such that a given reading is obtained. The calibration circuit used is shown in FIGURE 5 and in general comprises a means for utilizing the 60 cycle line frequency which is multiplied to get a frequency of 120 cycles per second. This wave is then clipped and differentiated so as to provide a wave comprised of a plurality of positive and negative spikes of large amplitude. These spikes or pulses are used to trigger a phantastron circuit which provides a square wave output. Means are provided in the phantastron circuit so that different factors of 120 can be selected and thus providing for the selection of a square wave of 8, 10 or 12 cycles per second. More specifically looking to FIGURE 4, a 60 cycle per second alternating current of approximately 12.6 volts is connected across a full wave rectifier bridge 194 by means of conductors 196 and 198. One end of bridge 194 is grounded via a conductor 200 while the other end is connected to a clipping circuit by means of a resistor 144. The output signal from the rectifier 194 has a frequency of twice that of the input signal or, in the case of the circuit of FIGURE 5, an output frequency of 120 cycles per second. The clipping circuit comprises a pair of diodes D18 and D20 which are serially and oppositely connected with one end to the resistor R144 and the other end to ground. The diodes D18 and D20 are of the zener type and clip the output wave from rectifier 194 such as to essentially provide a square wave. The clipped wave is then fed to a differentiating circuit comprising a capacitor C64 and a resistor R146. The capacitor C64 is connected to the clipping circuit and thence to ground via the resistor R146. The output from the differentiating circuit which is taken across resistor R146 is a plurality of alternate positive and negative pulses or spikes. In order to prevent triggering of the phantastron circuit from spurious positive waves and further in order to provide a triggering pulse of a narrow width, a clamping circuit is used. The clamping circuit comprises a diode D22, the positive side of which is connected to a suitable source of B+ via a resistor R148 and to ground via the resistor R146. The resistors R146 and R148 act as a potential divider and place the positive side of diode D22 at the desired positive potential. The negative terminal of the diode D22 is connected to a plate 202 of a pentode T46 and thence to a suitable source of B+ via the plate resistor R150. With this arrangement a desired positive potential is placed upon the negative terminal of diode D22. The relative amplitudes of the potentials on the positive and negative terminals are selected such as to render the diode D22 nonconductive during negative and spurious small-amplitude positive spikes and to render D22 conductive only above a predetermined magnitude of the large positive pulse from the differentiating circuit.

The pentode T46 has its suppressor grid 204 connected to a source of B+ via the resistor R152 and has its screen grid 206 connected to a source of B+ via the resistor R154 and thence to ground via resistor R156. The pentode T46 has its cathode 208 connected to ground via a voltage divider network comprising resistor R158 and a resistor R160. A capacitor C66 is connected between the plate 202 and the control grid 210. A resistor R158 is connected to the junction of the capacitor C66 and the screen grid 206 and thence to a switch 212. The switch 212 is ganged with the switch 14 and also has a plurality of positions a, b, c, and d. When switch 212 is in the 212a position, switch 14 is in the 14a position, and in a like manner switches 212 and 14 are related in their respective b, c, and d positions. With the switches 212 and 14 in their a positions, the instrument is set for operation; while in the b, c, and d positions the instrument is set for calibration. The position b of switch 212 is connected to a source of positive direct voltage through a variable voltage dividing network comprising a potentiometer R160 serially connected with a fixed resistor R162 which is connected to ground; in a like manner, the position c of switch 212 is connected to a source of positive voltage via a variable voltage divider comprising a potentiometer R164 and a fixed resistor R166 which is connected to ground; also position d of switch 212 is connected to a source of positive direct voltage via a variable voltage divider comprising a potentiometer R168 and a fixed resistor R170 which is also connected to ground. The phantastron circuit operates such that it produces essentially a square wave having a duration in the case shown in FIGURE 4 depending upon the RC time constant of capacitor C66, resistor R158 and the resistance of that one of the voltage divider networks R160, R162; R164, R166; or R168, R170, which is then connected in the circuit depending on the position of the switch 212. This RC time constant determines the pulse width or the frequency of the square wave. For example, while there may be four or five triggering pulses appearing at the positive terminal of diode D22, these are ineffective until the charge on the capacitor C66 has discharged through one of its appropriate resistance networks as mentioned above. This discharge time is also a function of the potential at the switch 212 at its positions b, c, and d, the level of which is determined by the setting of the potentiometer R160, R164, and R168, respectively. Thus by appropriately selecting the RC time constant, the frequency of the output square wave of the phantastron circuit can be selected to be some factor of the input frequency. As previously mentioned, the frequency of the triggering pulse to the phantastron was selected to be 120 cycles per second. The parameters of the RC circuit when the switch 212 is in the *b* position are selected such that the frequency of the output square wave is 8 cycles per second; likewise with the switch 212 in the *c* position, the parameters are such that the frequency of the output square wave is 10 cycles per second; and when the switch 212 is in the *d* position the parameters of the circuit are selected such that the frequency of the output square wave is 12 cycles per second. The output from the phantastron circuit shown in FIGURE 4 is taken from the cathode 208 across resistor R160 by way of the conductor 214a. Conductor 214a is connected to conductor 214b in FIGURE 1 and is coupled to the input circuitry of the instrument via the capacitor C68. With the gang switches 14 and 212 in their respective *b*, *c*, and *d* positions, the output from the phantastron circuit is fed via the conductor 214a into the input of the circuit of FIGURE 1 via the conductor 214b. At the same time the ganged switches 24 and 116 are placed in their respective *a*, *b*, or *c* positions such that when a calibration frequency of 8, 10 or 12 cycles per second is used, the switches 24 and 116 are in the corresponding appropriate 8, 10, or 12 cycles per second position. The wiper 170 of resistor R132 is then adjusted until a direct voltage of a desired magnitude is obtained for that calibration frequency. This in turn results in a desired pen deflection on the recorder pen. When the calibration has been performed, the gang switches 14 and 212 are then placed in their respective *a* positions and the device is ready for operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Apparatus for continuously determining the frequency of a desired low frequency component of a complex wave as for example the alpha frequency which falls within the alpha band from the complex wave from an electroencephalograph comprising means responsive to the complex wave and having an electrical signal of a frequency of a preselected multiple of the alpha frequency comprising amplifying means for amplifying the complex wave, frequency sensitive bridge means receiving the complex wave and tuned to the alpha band and having a substantially null balance of frequencies within the alpha band and having a complex output wave comprised substantially of components outside of the alpha band, means electrically connecting said frequency sensitive bridge means and said amplifying means with said complex output wave in opposition to the complex wave such that said amplifying means amplifies components of the complex wave within the alpha band and attenuates components of the complex wave outside of the alpha band, and means for multiplying the frequency of the wave out of said amplifying means by a preselected number and means responsive to said electrical signal and having an output signal with an amplitude varying in accordance with the frequency of said electrical signal.

2. Apparatus for continuously determining the frequency of a desired low frequency component of a complex wave as for example the alpha frequency which falls within the alpha band from the complex wave from an electroencephalograph comprising means responsive to the complex wave and having an electrical signal of a frequency of a preselected multiple of the alpha frequency comprising amplifying means for amplifying the complex wave, frequency sensitive bridge means receiving the complex wave and tuned to the alpha band and having a substantially null balance of frequencies within the alpha band and having a complex output wave comprised substantially of components outside of the alpha band, means electrically connecting said frequency sensitive bridge means and said amplifying means with said complex output wave in opposition to the complex wave such that said amplifying means amplifies components of the complex wave within the alpha band and attenuates components of the complex wave outside of said alpha band, and means for multiplying the frequency of the wave out of said amplifying means by a preselected number and means responsive to said electrical signal and having an output signal with an average amplitude varying in accordance with the frequency of said electrical signal over a selectably variable time base.

3. Apparatus for continuously determining the frequency of a desired component of a complex electrical wave comprising means responsive to the complex wave and having an electrical signal of a frequency of a preselected multiple of the frequency of the desired component of the complex wave including tuned network means tuned to a preselected band of frequencies including the frequency of the desired component of the complex wave for attenuating components of the complex wave having frequencies outside of said preselected band and means for multiplying the frequency of the wave out of said tuned network means by a preselected number, and means responsive to said electrical signal and having an output signal with an average amplitude varying in accordance with the frequency of said electrical signal over a selectably variable time base.

4. Apparatus for continuously determining the varying frequency of a desired component of a complex electrical wave comprising means responsive to the complex wave and having an electrical signal with a frequency of a preselected multiple of the frequency of the desired component of the complex wave including tuned network means tuned to a preselected band of frequencies including the frequency range of the desired component of the complex wave for amplifying the amplitude of those components of the complex wave having frequencies within said preselected band and for attenuating the amplitude of components of the complex wave having frequencies outside of said preselected band and means for increasing the frequency of the wave out of said tuned network means by a preselected factor, and means responsive to said electrical signal and having an output signal with an amplitude varying in accordance with the frequency of said electrical signal.

5. Apparatus for determining the frequency of a desired component falling within a known range of frequencies of a complex electrical wave having extreme variations in amplitude relative to the amplitude variations of the desired component comprising means responsive to the complex wave and having an electrical signal having a frequency of a preselected multiple of the frequency of the desired component of the complex wave including tuned network means tuned to a preselected band of frequencies including the known range of frequencies of the desired component of the complex wave for severely attenuating components of the complex wave having frequencies outside of said preselected band and having a wave predominantly composed of the desired component and means for multiplying the frequency of said wave out of said tuned network means by a preselected factor, and means responsive to said electrical signal and having an output signal with an amplitude varying in accordance with the frequency of said electrical signal.

6. Apparatus for continuously determining the varying frequency of a desired component of a complex electrical wave comprising means responsive to the complex wave and having an electrical signal of a frequency of a preselected multiple of the frequency of the desired component of the complex wave comprising amplifying means for amplifying the complex wave, tuned bridge means tuned to a band of frequencies including the frequency range of the desired component and having a substantially null balance of frequencies within said band and having a complex output wave comprised substantially of components outside of said band and electrically connected with said amplifying means with said complex output wave in opposition to the complex wave for attenuating components of the complex wave outside of said band, and means for multiplying the frequency of the wave out of said amplifying means by a preselected number, and means responsive to said electrical signal and having an output signal of an amplitude varying in accordance with the frequency of said electrical signal.

7. Apparatus for continuously determining the varying frequency of a desired component of a complex electrical wave comprising means responsive to the complex wave and having an electrical signal of a frequency of a preselected multiple of the frequency of the desired component of the complex wave comprising amplifying means for amplifying the complex wave, tuned bridge means tuned to a band of frequencies including the frequency range of the desired component and having a substantially null balance of frequencies within said band and having a complex output wave comprised substantially of components outside of said band and electrically connected with said amplifying means with said complex output wave in opposition to the complex wave for attenuating components of the complex wave out of said band, said tuned bridge means including a plurality of individually selectable tuned bridges each tuned to a portion of said band in ranges overlapping each other, and means for multiplying the frequency of the wave out of said amplifying means by a preselected number and means responsive to said electrical signal and having an output signal of an amplitude varying in accordance with the frequency of said electrical signal.

8. Apparatus for continuously determining the varying frequency of a desired component of a complex electrical wave comprising means responsive to the complex wave and having an electrical signal of a frequency of a preselected multiple of the frequency of the desired component of the complex wave comprising amplifying means for amplifying the complex wave, a frequency sensitive bridge tuned to a band of frequencies including the frequency range of the desired component and having a substantially null balance of frequencies within said band, said frequency sensitive bridge responsive to the output from said amplifying means and having a signal in opposite phase relationship to the complex wave electrically connected to the input of said amplifying means substantially composed of components outside of said band, and means for multiplying the frequency of the wave out of said amplifying means by a preselected number, and means responsive to said electrical signal and having an output signal with an amplitude varying in accordance with the frequency of said electrical signal.

9. Apparatus for continuously determining the varying frequency of a desired component of a complex electrical wave comprising means responsive to the complex wave and having an electrical signal of a frequency of a preselected multiple of the frequency of the desired component of the complex wave including tuned network means tuned to a preselected band of frequencies including the frequency range of the desired component of the complex wave for amplifying those components of the complex wave having frequencies within said preselected band and for attenuating components of the complex wave having frequencies outside of said preselected band and means for multiplying the frequency of the wave out of said tuned network means by a preselected number comprising phase inverter means for providing a pair of output signals of equal amplitude and opposite phase, rectifying means responsive to an alternating input wave and having an alternating output wave of a preselected multiple of the frequency of the input wave, and means electrically connected with said phase inverter and said rectifying means for applying said pair of output signals to said rectifying means and means responsive to said electrical signal and having an output signal with an amplitude varying in accordance with the frequency of said electrical signal.

10. Apparatus for continuously determining the varying frequency of a desired component of a complex electrical wave comprising means responsive to the complex wave and having an electrical signal of a frequency of a preselected multiple of the frequency of the desired component of the complex wave including attenuating means for attenuating the amplitude of the components of the complex wave outside of a preselected frequency band inclusive of the frequency of the desired component, comprising tuned network means tuned to said preselected frequency band for attenuating components of the complex wave having frequencies outside of said preselected band and tuned voltage divider means including a tank circuit tuned to said preselected frequency band for attenuating components of the complex wave having frequencies outside of said preselected band and means for multiplying the frequency of the wave out of said attenuating means by a preselected number, and means responsive to said electrical signal and having a signal with an amplitude varying in accordance with the frequency of said electrical signal.

11. Apparatus for continuously determining the varying frequency of a desired component of a complex electrical wave comprising means responsive to the complex wave and having an electrical signal of a frequency of a preselected multiple of the frequency of the desired component of the complex wave including a plurality of successively electrically interconnected stages comprising tuned network means tuned to a preselected band of frequencies including the frequency range of the desired component of the complex wave for attenuating components of the complex wave having frequencies outside of said preselected band and means for multiplying the frequency of the wave out of said tuned network means by a preselected number and means responsive to said electric signal and having an output signal with an amplitude varying in accordance with the frequency of said electrical signal.

12. Apparatus for continuously determining the varying frequency of a desired component of a complex electrical wave comprising means responsive to the complex wave and having an electrical signal of a frequency of a preselected multiple of the frequency of the desired component of the complex wave including a plurality of successively interconnected stages comprising tuned network means comprising amplifying means having an input and an output circuit for amplifying the complex wave and means including a frequency sensitive bridge tuned to a band of frequencies including the frequency range of the desired component and having two legs connected to said input circuit and two other legs connected to said output circuit and having a substantially null balance across said two legs of frequencies within said band and electrically connected across said input circuit the remaining components of the complex wave in opposite phase relationship with the complex wave for attenuating components of the complex wave outside of said band, and means for multiplying the frequency of the wave out of said tuned network means by a preselected number comprising phase inverter means for providing a pair of output signals of substantially equal amplitude and opposite phase, a full wave rectifier responsive to an alternating input wave for providing an alternating output wave of twice the frequency of the input wave and means electrically connected with said phase inverter and said rectifying means for applying said pair of output signals additively to said rectifying means, and means responsive to said electrical signal and having a final output signal with an amplitude varying in accordance with the frequency of said electrical signal.

13. Apparatus for continuously determining the varying frequency of a desired component of a complex electrical wave comprising means responsive to the complex wave and having an electrical signal of a frequency of a preselected multiple of the frequency of the desired component of the complex wave including tuned network means comprising amplifying means for amplifying the complex wave and tuned bridge means tuned to a band of frequencies including the frequency range of the desired component and having a substantially null balance of frequencies within said band and electrically connected with said amplifying means for attenuating components of the complex wave outside of said band, tuned voltage divider means electrically connected with said tuned network means and including a tank circuit tuned to said preselected frequency band for attenuating components of the wave out of said tuned network means having frequencies outside of said preselected band, and means for multiplying the frequency of the electrical wave impressed across said tank circuit of said tuned voltage divider means by a preselected number, and means responsive to said electrical signal and having an output signal with an amplitude varying in accordance with the frequency of said electrical signal.

References Cited by the Examiner

UNITED STATES PATENTS

| | | |
|---|---|---|
| 2,425,811 | 8/1947 | Kent. |
| 2,491,186 | 12/1949 | Kent _____ 324—77 |
| 2,648,822 | 8/1953 | Walter _____ 324—77 |
| 2,803,801 | 8/1957 | Cunningham _____ 324—77 |
| 2,954,522 | 9/1960 | Dickey et al. _____ 324—78 |
| 2,986,698 | 5/1961 | Burkland _____ 324—78 |

FOREIGN PATENTS

| | | |
|---|---|---|
| 562,817 | 7/1944 | Great Britain. |
| 634,914 | 3/1960 | Great Britain. |

OTHER REFERENCES

"Electroencephalography," Radio-Electronics, April 1955, pp. 56–57.

"Measurement of Wow and Flutter," Electronics, June 24, 1960, pp. 100–102.

WALTER L. CARLSON, *Primary Examiner.*

SAMUEL BERNSTEIN, *Examiner.*